United States Patent
Lei

(10) Patent No.: US 12,457,601 B2
(45) Date of Patent: Oct. 28, 2025

(54) METHOD AND APPARATUS FOR DL AND UL SCHEDULING AND TRANSMISSION

(71) Applicant: Lenovo (Beijing) Limited, Beijing (CN)

(72) Inventor: Haipeng Lei, Haidian District (CN)

(73) Assignee: Lenovo (Beijing) Limited, Beijing (CN)

( * ) Notice: Subject to any disclaimer, the term of this patent is extended or adjusted under 35 U.S.C. 154(b) by 383 days.

(21) Appl. No.: 18/022,237

(22) PCT Filed: Sep. 30, 2020

(86) PCT No.: PCT/CN2020/119313
§ 371 (c)(1),
(2) Date: Feb. 20, 2023

(87) PCT Pub. No.: WO2022/067641
PCT Pub. Date: Apr. 7, 2022

(65) Prior Publication Data
US 2024/0205911 A1   Jun. 20, 2024

(51) Int. Cl.
| H04W 72/0446 | (2023.01) |
| H04L 5/00 | (2006.01) |
| H04W 72/1263 | (2023.01) |
| H04W 72/232 | (2023.01) |

(52) U.S. Cl.
CPC ... *H04W 72/1263* (2013.01); *H04W 72/0446* (2013.01); *H04W 72/232* (2023.01)

(58) Field of Classification Search
None
See application file for complete search history.

(56) References Cited

U.S. PATENT DOCUMENTS

| 12,289,712 | B2* | 4/2025 | Ren | H04L 5/0048 |
| 2018/0132264 | A1* | 5/2018 | Jung | H04W 72/20 |
| 2019/0037561 | A1 | 1/2019 | Jung et al. | |
| 2019/0141737 | A1 | 5/2019 | Kim et al. | |
| 2019/0230656 | A1 | 7/2019 | Soriaga et al. | |
| 2021/0136802 | A1* | 5/2021 | Cirik | H04L 5/0092 |
| 2021/0377982 | A1* | 12/2021 | Yang | H04W 72/23 |

(Continued)

FOREIGN PATENT DOCUMENTS

CN   111699648 A   9/2020

OTHER PUBLICATIONS

3GPP , "Physical layer procedures for data", 3GPP TS 38.214 V16.2.0 [retrieved Feb. 21, 2023]. Retrieved from the Internet <https://portal.3gpp.org/desktopmodules/Specifications/SpecificationDetails.aspx?specificationId=3216>., Jun. 2020, 163 Pages.

(Continued)

*Primary Examiner* — Duc T Duong
(74) *Attorney, Agent, or Firm* — FIG. 1 Patents

(57) ABSTRACT

Embodiments of the present disclosure relate to methods and apparatuses for DL and UL scheduling and transmission. According to some embodiments of the disclosure, a method for wireless communications performed by a UE may include: receiving a downlink control information (DCI) format for scheduling a transport block (TB); and determining whether the DCI format schedules the TB on a super slot or a slot, wherein the super slot includes a plurality of consecutive slots in a time domain resource.

20 Claims, 8 Drawing Sheets

(56) References Cited

U.S. PATENT DOCUMENTS

| | | | | |
|---|---|---|---|---|
| 2022/0201666 A1* | 6/2022 | Harada | | H04W 72/044 |
| 2022/0232615 A1* | 7/2022 | Luo | | H04L 1/0025 |
| 2022/0240312 A1* | 7/2022 | Xu | | H04L 5/0037 |
| 2022/0337374 A1* | 10/2022 | Tiirola | | H04W 72/23 |
| 2022/0368465 A1* | 11/2022 | Wong | | H04L 1/1864 |
| 2023/0007651 A1* | 1/2023 | Shi | | H04W 72/0446 |
| 2023/0189288 A1* | 6/2023 | Karaki | | H04W 72/232 |
| | | | | 370/329 |
| 2023/0232421 A1* | 7/2023 | Yi | | H04B 7/0695 |
| | | | | 370/329 |
| 2023/0284218 A1* | 9/2023 | Chou | | H04W 72/0446 |
| | | | | 370/329 |

OTHER PUBLICATIONS

CATT, "Corrections to DL/UL scheduling and HARQ management", 3GPP TSG RAN WG1 Meeting #94, R1-1808380, Gothenburg, Sweden [retrieved Feb. 21, 2023]. Retrieved from the Internet <https://www.3gpp.org/ftp/tsg_ran/wg1_rL 1/TSGR1_94/Docs/>., Aug. 2018, 16 Pages.

PCT/CN2020/119313, "International Preliminary Report on Patentability", PCT Application No. PCT/CN2020/119313, Apr. 13, 2023, 5 pages.

PCT/CN2020/119313, "International Search Report and Written Opinion", PCT Application No. PCT/CN2020/119313, Jun. 24, 2021, 6 pages.

20955666.1, "European Search Report", Application No. 20955666.1, Jun. 4, 2024, 13 pages.

Huawei, et al., "Evaluations for contiguous data transmission with cross-carrier scheduling", 3GPP TSG RAN WG1 Meeting #97 R1-1906601 3rd Generation Partnership Project (3GPP), Mobile Competence Centre; 650, Route Des Lucioles; F-06921 Sophia-Antipolis Cedex; France, vol. RAN WG1, No. Reno, USA, May 13, 2019, 3 pages.

Nokia, Nokia Shanghai Bell, "Feature lead summary #2 on Cross-carrier Scheduling with Different Numerologies", 3GPP TSG RAN WG1 Meeting #97 R1-1907759 7.2.13.2 Summary #2, 3rd Generation Partnership Project (3GPP), Mobile Competence Centre; 650, Route Des Lucioles; F-06921 Sophia-Antipolis Cedex; France, vol. Ran WG1, no.

* cited by examiner

METHOD AND APPARATUS FOR DL AND UL SCHEDULING AND TRANSMISSION

TECHNICAL FIELD

Embodiments of the present disclosure generally relate to wireless communication technology, and more particularly to downlink (DL) and uplink (UL) scheduling and transmission.

BACKGROUND

Wireless communication systems are widely deployed to provide various telecommunication services such as telephony, video, data, messaging, broadcasts, and so on. Wireless communication systems may employ multiple access technologies capable of supporting communication with multiple users by sharing available system resources (e.g., time, frequency, and power). Examples of wireless communication systems may include fourth generation (4G) systems such as long term evolution (LTE) systems, LTE-advanced (LTE-A) systems, or LTE-A Pro systems, and fifth generation (5G) systems which may also be referred to as new radio (NR) systems.

In a wireless communication system, a user equipment (UE) may monitor a physical downlink control channel (PDCCH) in one or more search spaces. The PDCCH may carry downlink control information (DCI), which may schedule uplink channels, such as a physical uplink shared channel (PUSCH), or downlink channels, such as a physical downlink shared channel (PDSCH). In the case that a DCI schedules a PDSCH, the UE may transmit hybrid automatic repeat request acknowledgement (HARQ-ACK) feedback (e.g., included in a HARQ-ACK codebook) corresponding to the PDSCH through a PUSCH or a physical uplink control channel (PUCCH).

There is a need for handling (UL) and downlink (DL) scheduling and transmissions in a wireless communication system.

SUMMARY

Some embodiments of the present disclosure provide a method for wireless communications performed by a user equipment (UE). The method may include: receiving a downlink control information (DCI) format for scheduling a transport block (TB); and determining whether the DCI format schedules the TB on a super slot or a slot, wherein the super slot includes a plurality of consecutive slots in time domain resource.

Some embodiments of the present disclosure provide a method for wireless communications performed by a base station (BS). The method may include: determining to schedule a transport block (TB) on a super slot, wherein the super slot includes a plurality of consecutive slots in a time domain resource: transmitting a downlink control information (DCI) format for scheduling the TB on the super slot.

In some embodiments of the present disclosure, the super slot is defined within a subframe or radio frame and integer number of super slots is included in a subframe or radio frame. In some examples, the method may further include: transmitting the number of slots in the super slot via radio resource control (RRC) signaling. In some examples, the number of slots in the super slot is predefined according to subcarrier spacing.

In some embodiments of the present disclosure, in response to the DCI format scheduling a physical downlink shared channel (PDSCH) for carrying the TB on the super slot, a timing offset between the PDSCH and corresponding hybrid automatic repeat request acknowledgement (HARQ-ACK) feedback is indicated by the DCI format in units of super slot.

In some embodiments of the present disclosure, in response to the DCI format scheduling a physical downlink shared channel (PDSCH) for carrying the TB on the super slot, a timing offset between a physical downlink control channel (PDCCH) carrying the DCI format and the PDSCH is indicated by the DCI format in units of super slot.

In some embodiments of the present disclosure, in response to the DCI format scheduling a physical uplink shared channel (PUSCH) for carrying the TB on the super slot, a timing offset between a physical downlink control channel (PDCCH) carrying the DCI format and the PUSCH is indicated by the DCI format in units of super slot.

In some embodiments of the present disclosure, the DCI format indicates an entry from a time domain resource allocation (TDRA) list. In some examples, the method may further include transmitting the TDRA list via radio resource control (RRC) signaling. In some examples, the TDRA list is predefined. In some embodiments of the present disclosure, the entry of the TDRA list includes at least one start and length indicator value (SLIV) indicating the index of the first scheduled symbol in the first slot of the super slot and the number of scheduled symbols in the last slot of the super slot. In some embodiments of the present disclosure, the entry of the TDRA list indicates the index of the first scheduled symbol in the first slot of the super slot and the index of the last scheduled symbol in the last slot of the super slot.

In some embodiments of the present disclosure, the DCI format indicates a start and length indicator value (SLIV) indicating the index of the first scheduled symbol in the first slot of the super slot and the number of scheduled symbols in the last slot of the super slot. In some embodiments of the present disclosure, the DCI format indicates the index of the first scheduled symbol in the first slot of the super slot and the index of the last scheduled symbol in the last slot of the super slot. In some embodiments of the present disclosure, the DCI format indicates the index of the first scheduled symbol in the first slot of the super slot. In some embodiments of the present disclosure, the DCI format indicates the index of the last scheduled symbol in the last slot of the super slot. In some embodiments of the present disclosure, the DCI format indicates a super slot level offset between the super slot where the DCI format is transmitted and the super slot where the TB is scheduled.

In some embodiments of the present disclosure, a cyclic redundancy check (CRC) of the DCI format is scrambled by a radio network temporary identity (RNTI) for super slot level scheduling. In some embodiments of the present disclosure, the DCI format is transmitted in a search space for super slot level scheduling. In some embodiments of the present disclosure, the DCI format includes a bit indicating the DCI format is used for super slot level scheduling. In some embodiments of the present disclosure, the DCI format has a payload size different to that of a DCI format scheduling a TB on a slot. in some examples, the DCI format for super slot level scheduling includes an extra bit to differentiate it from the DCI format for slot level scheduling, or the DCI format for slot level scheduling includes an extra bit to differentiate it from the DCI format for super slot level scheduling In some embodiments of the present disclosure, each entry of the TDRA list indicates whether the DCI format schedules the TB on a super slot or a slot.

Some embodiments of the present disclosure provide an apparatus. According to some embodiments of the present disclosure, the apparatus may include: at least one non-transitory computer-readable medium having stored thereon computer-executable instructions: at least one receiving circuitry: at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions may be configured to, with the at least one processor, cause the apparatus to perform a method according to some embodiments of the present disclosure.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

The detailed description of the appended drawings is intended as a description of the preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as the 3rd generation partnership project (3GPP) 5G (NR), 3GPP long-term evolution (LTE) Release 8, and so on. It is contemplated that along with the developments of network architectures and new service scenarios, all embodiments in the present disclosure are also applicable to similar technical problems; and moreover, the terminologies recited in the present disclosure may change, which should not affect the principles of the present disclosure.

Figure 1:
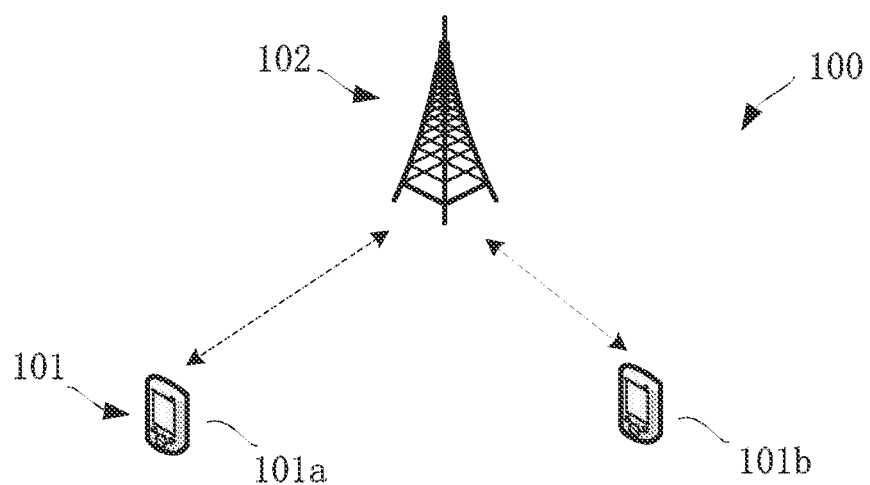
FIG. 1 illustrates a schematic diagram of a wireless communication system in accordance with some embodiments of the present disclosure.

FIG. 1 illustrates a schematic diagram of a wireless communication system 100 in accordance with some embodiments of the present disclosure.

As shown in FIG. 1, a wireless communication system 100 may include some UEs 101 (e.g., UE 101a and UE 101b) and a base station (e.g., BS 102). Although a specific number of UEs 101 and BS 102 are depicted in FIG. 1, it is contemplated that any number of UEs and BSs may be included in the wireless communication system 100.

The UE(s) 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to some embodiments of the present disclosure, the UE(s) 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present disclosure, the UE(s) 101 includes wearable devices, such as smart watches, fitness bands, optical head-mounted displays, or the like. Moreover, the UE(s) 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE(s) 101 may communicate with the BS 102 via uplink (UL) communication signals.

The BS 102 may be distributed over a geographic region. In certain embodiments of the present disclosure, the BS 102 may also be referred to as an access point, an access terminal, a base, a base unit, a macro cell, a Node-B, an evolved Node B (eNB), a gNB, a Home Node-B, a relay node, or a device, or described using other terminology used in the art. The BS 102 is generally a part of a radio access network that may include one or more controllers communicably coupled to one or more corresponding BSs 102. The BS 102 may communicate with UE(s) 101 via downlink (DL) communication signals.

The wireless communication system 100 may be compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

In some embodiments of the present disclosure, the wireless communication system 100 is compatible with the 5G NR of the 3GPP protocol. For example, BS 102 may transmit data using an OFDM modulation scheme on the DL and the UE(s) 101 may transmit data on the UL using a discrete Fourier transform-spread-orthogonal frequency division multiplexing (DFT-S-OFDM) or cyclic prefix- OFDM (CP-OFDM) scheme. More generally, however, the wireless communication system 100 may implement some other open or proprietary communication protocols, for example, WiMAX, among other protocols.

In some embodiments of the present disclosure, the BS 102 and UE(s) 101 may communicate using other communication protocols, such as the IEEE 802.11 family of wireless communication protocols. Further, in some embodiments of the present disclosure, the BS 102 and UE(s) 101 may communicate over licensed spectrums, whereas in some other embodiments, the BS 102 and UE(s) 101 may communicate over unlicensed spectrums. The present disclosure is not intended to be limited to the implementation of any particular wireless communication system architecture or protocol.

NR Release 17 will expand the frequency range to 71GHz. Due to the phase noise effect at a high frequency band, higher subcarrier spacing (SCS) may be specified for the purpose of reliability. For example, 240 kHz SCS, 480 KHz SCS, 960 KHz SCS, and even 1920 kHz SCS may be considered. It is known that the higher the SCS, the shorter the duration of a slot. For example, Table 1 below shows exemplary slot durations for different SCS. It should be understood that Table 1 is only for illustrative purposes, and should not be construed as limiting the embodiments of the present disclosure.

TABLE 1

Slot durations for different SCS

| $\mu$ | $\Delta f = 2^\mu \cdot 15$ [kHz] | Slot duration |
|---|---|---|
| 0 | 15 | 1 ms |
| 1 | 30 | 0.5 ms |
| 2 | 60 | 0.25 ms |
| 3 | 120 | 0.125 ms |
| 4 | 240 | 0.0625 ms |
| 5 | 480 | 31.25 µs |
| 6 | 960 | 15.625 µs |

In the above Table 1, the SCS configuration $\mu$ is associated with the SCS (listed in the second column of Table 1). For example, "$\mu=4$" may indicate a SCS of 240 kHz, and the slot duration for such SCS is 0.0625 ms.

For SCS configuration $\mu$, there are $N_{slot}^{subframe,\mu}$ slots within one subframe which can be numbered $n_s^\mu \in \{0, \ldots, N_{slot}^{subframe,\mu}-1\}$ in increasing order within a subframe and $N_{slot}^{subframe,\mu}$ slots within one radio frame which can be numbered $n_{s,f}^\mu \in \{0, \ldots, N_{slot}^{frame,\mu}-1\}$ in increasing order within a frame. For example, Table 2 below shows an exemplary number of slots per subframe and per frame. It should be understood that Table 2 is only for illustrative purposes, and should not be construed as limiting the embodiments of the present disclosure.

TABLE 2

Number of slots per subframe and per frame for normal cyclic prefix

| $\mu$ | $\Delta f = 2^\mu \cdot 15$ [kHz] | $N_{slot}^{frame,\mu}$ | $N_{slot}^{subframe,\mu}$ |
|---|---|---|---|
| 0 | 15 | 10 | 1 |
| 1 | 30 | 20 | 2 |
| 2 | 60 | 40 | 4 |
| 3 | 120 | 80 | 8 |
| 4 | 240 | 160 | 16 |
| 5 | 480 | 320 | 32 |
| 6 | 960 | 640 | 64 |

As shown in above Table 1, the duration of a single slot for, for example, 240 KHz SCS, 480 kHz SCS or 960 kHz SCS is quite short. It would be beneficial to allow a single DCI format to schedule multiple slots when a relatively high SCS is applied. For example, the transmission of a single transport block (TB) on a single PUSCH or PDSCH occupying multiple slots may be allowed. The potential benefits include, but are not limited to, the following: (1) UE power consumption reduction because there may be no need to monitor the physical downlink control channel (PDCCH) in every slot: (2) remaining the existing maximum number of HARQ processes for the UE's soft buffer size maintenance: (3) saving the cyclic redundancy check (CRC) overhead of the TB compared to scheduling multiple TBs on multiple slots: and (4) not increasing the UE's processing capability requirements in the slot level.

Figure 2:
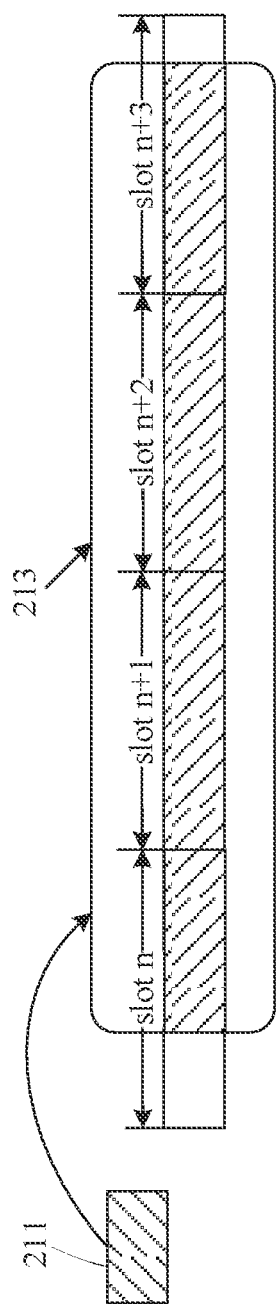
FIG. 2 illustrates a schematic diagram of a DCI format scheduling a DL or UL transmission(s) in accordance with some embodiments of the present disclosure.

FIG. 2 illustrates a schematic diagram of a DCI format scheduling a DL or UL transmission(s) in accordance with some embodiments of the present disclosure. It should be understood that FIG. 2 is only for illustrative purposes, and should not be construed as limiting the embodiments of the present disclosure.

As shown in FIG. 2, DCI format 211 may schedule TB 213 on multiple slots (e.g., slot n to slot n+3). The TB 213 may be carried on a PDSCH or a PUSCH. In this way, a single HARQ process is needed for the multiple slots (e.g., slot n to slot n+3). In some embodiments, DCI format 211 may only schedule one PDSCH or PUSCH, which carries at least TB 213. For example, the PDSCH or PUSCH may only carry TB 213. Or the PDSCH or PUSCH may carry TB 213 and another TB (not shown in FIG. 2) immediately following TB 213. In some other embodiments, DCI format 211 may schedule more than one PDSCH or PUSCH, each of which may carry at least one TB. For example, DCI format 211 may schedule two PDSCHs, the first PDSCH carries TB 213 and the second PDSCH (not shown in FIG. 2) carries another TB (not shown in FIG. 2) immediately following TB 213.

However, for a single TB scheduled on multiple slots, there remain some unsolved issues. For example, how to define the concept of the multiple slots? How to indicate the time domain resource allocation to a UE? How to differentiate between DCI formats scheduling a TB on a single slot and on multiple slots? This is needed since a single slot may be assigned to transmit a small packet.

Solutions for scheduling DL and UL transmissions are provided. The disclosed solutions are especially advantageous when high SCS is applied. More details on the embodiments of the present disclosure will be illustrated in the following text in combination with the appended drawings.

In some embodiments of the present disclosure, the concept of a super slot is introduced as a new time domain resource unit or a scheduling unit. A super slot may include a plurality of consecutive slots. In some embodiments, an integer number of super slots may be included in a subframe or radio frame. Denoting the number of consecutive slots in a super slot as N, in some embodiments, the value of N may be configured by radio resource control (RRC) signaling, which could be a dedicated RRC signaling message or a system information block (SIB) message. In some embodiments, the value of N may be predefined according to SCS, for example, N=2 for 120 kHz SCS, N=4 for 240 kHz SCS, N=8 for 480 kHz SCS, and so on, and thus can be determined implicitly.

In some embodiments of the present disclosure, super slot may be used as time domain resource unit, and may be defined within a radio frame or subframe. The duration of one super slot may be longer than one slot, and may be shorter than or equal to one subframe or radio frame. Super slot may be also used as the scheduling unit for scheduling PDSCH or PUSCH. A single TB may be carried by the PDSCH or PUSCH on the assigned super slot and a single HARQ process number may be indicated to be associated with the single TB. In some examples, this single TB may be transmitted without repetition on the super slot. For example, only redundancy version 0 (RV0) of the TB is transmitted on the super slot. In some other examples, this single TB may be transmitted with a plurality of repetitions on the super slot. For example, in the case that a super slot includes four slots, RV0, RV2, RV3 and RV1 may be transmitted on the four slots in sequence.

Regarding the super slot structure, a super slot(s) may be defined within each subframe or radio frame. The super slot(s) within a subframe or radio frame may be numbered from 0 to $$\frac{N_{slot}^{subframe,\mu}}{N} - 1$$

within the subframe or from 0 to $$\frac{N_{slot}^{frame,\mu}}{N} - 1$$

within the radio frame. In this way, from the first slot of the subframe or the radio frame, every N consecutive slots are grouped as a single super slot. The value of N should be set in a manner that the number of slots within a subframe or radio frame is equally divided. In this way, an integer number of super slots is included in a subframe or a radio frame.

Figure 3:
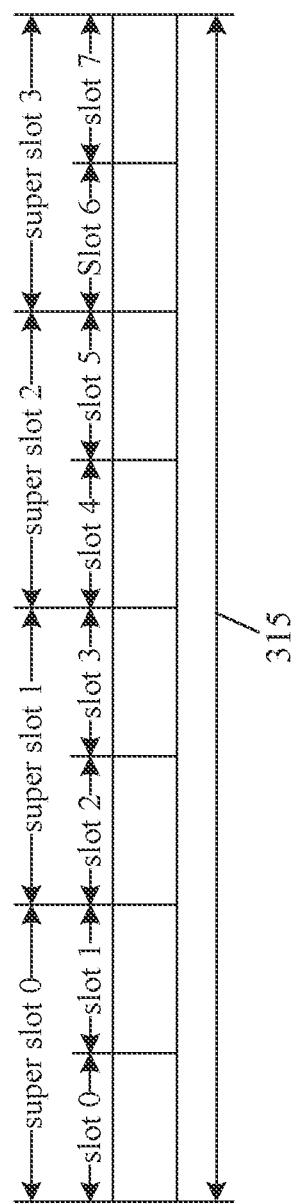
FIG. 3 illustrates an example structure of a subframe in accordance with some embodiments of the present disclosure.

FIG. 3 illustrates an example structure of a subframe in accordance with some embodiments of the present disclosure. As shown in FIG. 3, the SCS of subframe 315 may be 120 kHz. Thus, according to the above Table 2, subframe 315 may include 8 slots numbered as slot 0 to slot 7. In the example of FIG. 3, every 2 slots are grouped as a super slot. Therefore, there are 4 super slots in subframe 315, which are numbered as super slot 0 to super slot 3.

Along with the introduction of the super slot as the time domain resource unit as well as the scheduling unit, the information indicated in a DCI format may also be redefined to suit the concept of the super slot.

For example, in some embodiments, in the case that a DCI format schedules a PDSCH to carry a TB on a super slot, the DCI format may include an indicator (e.g., PDSCH-to-HARQ_feedback timing indicator) for determining the timing of the HARQ-ACK feedback corresponding to the PDSCH. The indicator may indicate a timing offset in a super slot level between the super slot where the scheduled PDSCH is transmitted and the super slot where the corresponding HARQ-ACK feedback is transmitted. The corresponding HARQ-ACK feedback may be carried by a physical uplink control channel (PUCCH).

The duration of the super slot for PDSCH transmission may be the same or different from the duration of the super slot for PUCCH transmission. When the two durations are different, the PDSCH-to-HARQ_feedback timing indicator in a DCI format may indicate the above timing offset in the unit of UL (e.g., PUCCH) super slot. The number of slots within a super slot for DL transmission and the number of slots within a super slot for UL transmission may be separately configured or predefined. That is, a separate number of slots in a UL super slot and DL super slot may be configured or predefined.

In some embodiments, a DCI format may include information for PDSCH transmission timing determination. For example, a time domain resource allocation (TDRA) indicator in a DCI format may indicate the timing offset (e.g., k0) in super slot level between the super slot where the DCI format is transmitted and the super slot where the scheduled PDSCH is transmitted. In some instances, considering that a super slot is relatively longer than a slot, the scheduled PDSCH can be restricted in the same super slot as the DCI format. In these instances, the TDRA indicator in a DCI format does not need to indicate the timing offset between the DCI format and the scheduled PDSCH. For example, k0 is set to 0 for super slot level scheduling. In some cases, the DCI format may not need to indicate the value of k0.

In some embodiments, a DCI format may include information for PUSCH transmission timing determination. For example, the TDRA indicator in a DCI format may indicate the timing offset (e.g., k2) in a super slot level between the super slot where the DCI format is transmitted and the super slot where the scheduled PUSCH is transmitted. The duration of the super slot for PDCCH (e.g., DCI format) transmission may be the same as or different from the duration of the super slot for PUSCH transmission. When the two durations are different, the TDRA indicator in the DCI format may indicate the timing offset in the unit of a UL (e.g., PUSCH) or DL (e.g., PDCCH) super slot. The number of slots within a super slot for DL transmission and the number of slots within a super slot for UL transmission may be separately configured or predefined. That is, a separate number of slots in a UL super slot and a DL super slot may be configured or predefined.

In some embodiments, the TDRA indicator in a DCI format may indicate an entry from a TDRA list. The TDRA list may be configured by RRC signaling or predefined.

In some examples, each entry of the list may indicate at least one of the value of k0 and the value of k2 as described above. In some examples, each entry of the list may indicate a mapping type, which may denote, for example, whether the PUSCH or PDSCH mapping starts from a slot boundary. The number of bits in the DCI format for the TDRA indicator may be equal to $[\log_2(I)]$, where I denotes the number of entries in the TDRA list.

In some examples, each entry of the list may indicate at least one start and length indicator value (SLIV), which jointly indicates the starting symbol index and the duration. In response to the DCI format scheduling a TB on a super slot, the starting symbol index means the index of the first scheduled symbol in the first slot of the super slot and the duration means the number of consecutive symbols in the last slot of the super slot. The assigned resource in the last slot of the super slot may be started from its first symbol (e.g., symbol 0). All the middle slots of the super slot (e.g., the slots in the super slot except for the first and the last slots of the super slot) are fully occupied, and thus do not need any further indication. In these examples, a full or partial super slot can be assigned for transmitting the scheduled PDSCH or the PUSCH. A TDRA list including a plurality of entries indicating different SLIVs may be configured or predefined.

Figure 4:
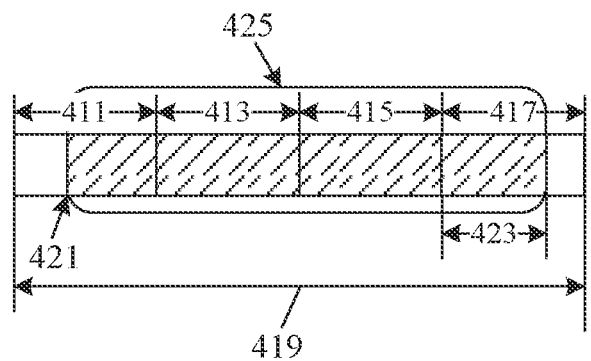
FIG. 4 illustrates an example structure of a super slot in accordance with some embodiments of the present disclosure.

FIG. 4 illustrates an example structure of a super slot in accordance with some embodiments of the present disclosure. As shown in FIG. 4, a TB 425 may be scheduled on super slot 419 by a DCI format. The TB 425 may be carried by a PDSCH or a PUSCH. The super slot 419 may include 4 consecutive slots (e.g., slots 411-417). As described above, the DCI format may include a TDRA indicator indicating a SLIV. The SLIV may jointly encode the starting symbol index of the first scheduled symbol (e.g., symbol 421) in the first slot (e.g., slot 411) of the super slot and the number of scheduled symbols (e.g., duration 423) in the last slot (e.g., slot 417) of the super slot. For example, in the case that 14 symbols are included in a slot and numbered from 0 to 13, the index of the symbol 421 in slot 411 and the duration 423 in slot 417 (in the number of consecutive symbols) are greater than or equal to 0 and less than or equal to 13, and are jointly encoded as the SLIV.

In some examples, each entry of the list may indicate the index of the first scheduled symbol in the first slot of the super slot (also referred to as "starting symbol index") and the index of the last scheduled symbol in the last slot of the super slot (also referred to as "last symbol index"). The assigned resource in the last slot of the super slot may be started from its first symbol (e.g., symbol 0). All the middle slots of the super slot (e.g., the slots in the super slot except for the first and the last slots of the super slot) are fully occupied, and thus do not need any further indication. In these examples, a full or partial super slot can be assigned for transmitting the scheduled PDSCH or the PUSCH. A TDRA list including a plurality of entries indicating different starting symbol indices or the last symbol indices may be configured or predefined.

Figure 5:
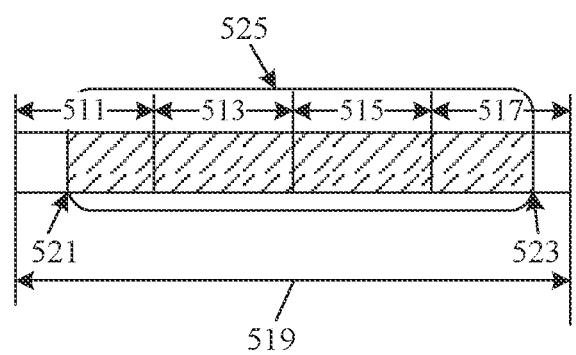
FIG. 5 illustrates an example structure of a super slot in accordance with some embodiments of the present disclosure.

FIG. 5 illustrates an example structure of a super slot in accordance with some embodiments of the present disclosure. As shown in FIG. 5, a TB 525 may be scheduled on super slot 519 by a DCI format. The TB 525 may be carried by a PDSCH or a PUSCH. The super slot 519 may include 4 consecutive slots (e.g., slots 511-517). As described above, the DCI format may include a TDRA indicator indicating a starting symbol index of the first scheduled symbol (e.g., symbol 521) in the first slot (e.g., slot 511) of the super slot and a last symbol index of the last scheduled symbol (e.g., symbol 523) in the last slot (e.g., slot 517) of the super slot. For example, in the case that 14 symbols are included in a slot and numbered from 0 to 13, the index of the symbol 521 in slot 511 and the index of the symbol 523 in slot 517 are greater than or equal to 0 and less than or equal to 13, and are separately indicated in an entry of the TDRA list.

In some embodiments, the TDRA indicator in a DCI format may indicate a SLIV, which jointly indicates the starting symbol index and the duration. In response to the DCI format scheduling a TB on a super slot, the starting symbol index means the index of the first scheduled symbol in the first slot of the super slot and the duration means the number of consecutive symbols in the last slot of the super slot. The assigned resource in the last slot of the super slot may be started from its first symbol (e.g., symbol 0). All the middle slots of the super slot (e.g., the slots in the super slot except for the first and the last slots of the super slot) are fully occupied, and thus do not need any further indication. In these embodiments, a full or partial super slot can be assigned for transmitting the scheduled PDSCH or the PUSCH.

In the case that 14 symbols are included in a slot, the number of bits in the DCI format for the TDRA indicator is equal to 7. The 7 bits in the DCI format can flexibly indicate any possible SLIVs in a slot.

In some embodiments, the TDRA indicator in a DCI format may indicate the index of the first scheduled symbol in the first slot of the super slot and the index of the last scheduled symbol in the last slot of the super slot. The assigned resource in the last slot of the super slot may be started from its first symbol (e.g., symbol 0). All the middle slots of the super slot (e.g., the slots in the super slot except for the first and the last slots of the super slot) are fully occupied, and thus do not need any further indication. In these embodiments, a full or partial super slot can be assigned for transmitting the scheduled PDSCH or the PUSCH.

In the case that 14 symbols are included in a slot, each of the starting symbol index and last symbol index at most needs 4 bits to indicate the symbol index range from 0 to 13, and thus at most 8 bits are needed in a DCI format for the TDRA indicator. The 8 bits in the DCI format can flexibly indicate any possible starting symbols in the first slot of a super slot and ending symbols in the last slot of a super slot.

In some embodiments, the TDRA indicator in a DCI format may indicate the index of the first scheduled symbol in the first slot of the super slot. All the symbols in the last slot of the super slot are assigned for transmission. In addition, all the middle slots of the super slot (e.g., the slots in the super slot except for the first and the last slots of the super slot) are fully occupied, and thus also do not need any further indication. In the case that 14 symbols are included in a slot, at most 4 bits are needed in a DCI format for the TDRA indicator to indicate the symbol index range from 0 to 13. In these embodiments, a full or partial super slot can be assigned for transmitting the scheduled PDSCH or the PUSCH.

In some embodiments, the TDRA indicator in a DCI format may indicate the index of the last scheduled symbol in the last slot of the super slot. All the symbols in the first slot of the super slot are assigned for transmission. In addition, all the middle slots of the super slot (e.g., the slots in the super slot except for the first and the last slots of the super slot) are fully occupied, and thus also do not need any further indication. In the case that 14 symbols are included in a slot, at most 4 bits are needed in a DCI format for the TDRA indicator to indicate the symbol index range from 0 to 13. In these embodiments, a full or partial super slot can be assigned for transmitting the scheduled PDSCH or the PUSCH.

In some embodiments, the TDRA indicator in a DCI format may indicate the super slot level offset between the super slot where the DCI format is transmitted and the super slot where the scheduled PDSCH or PUSCH is transmitted. In these embodiments, a full super slot is assigned for transmitting the scheduled PDSCH or the PUSCH. It is not necessary to configure or predefine a TDRA list with different entries for different SLIVs (or starting symbol indices and last symbol indices).

Furthermore, the PDCCH monitoring occasion may be configured based on a super slot level. For example, a PDCCH may be configured to be monitored in a period of one or more super slots. For example, a UE may monitor the PDCCH every 2 super slots. In some examples, a PDCCH can be configured at the beginning of the first slot within a super slot and PUCCH resource can be configured at the end of the last slot within the super slot. The remaining part of the super slot can be used for PDSCH or PUSCH transmission.

In some embodiments of the present disclosure, a super slot may only be used as the scheduling unit for scheduling PDSCH or PUSCH, and may not be numbered in the time domain. The starting slot of a super slot may be implicitly determined based on the DCI format, instead of being predefined within a subframe or radio frame as described above.

For example, a DCI format scheduling a PDSCH in a super slot may imply that the PDSCH occupies N consecutive slots and the starting slot of the super slot is derived based on a slot level offset indicated by the DCI format with reference to the slot where the DCI format is transmitted. A single TB may be carried by the scheduled PDSCH or PUSCH on the assigned super slot and a single HARQ process number may be indicated to be associated with the single TB. In some examples, this single TB may be transmitted without repetition on the super slot. For example, only redundancy version 0 (RV0) of the TB is transmitted on the super slot. In some other examples, this single TB may be transmitted with a plurality of repetitions on the super slot. For example, in the case that a super slot includes four slots, RV0, RV2, RV3 and RV1 may be transmitted on the four slots in sequence.

Regarding HARQ-ACK feedback timing determination, the indicator (e.g., PDSCH-to-HARQ_feedback timing indicator) for determining the timing of the HARQ-ACK feedback corresponding to the PDSCH in a DCI format may indicate the timing offset in a slot level between the slot where the scheduled PDSCH transmission is ended and the slot where the corresponding HARQ-ACK feedback is transmitted.

Regarding PUSCH transmission timing determination, the TDRA indicator in a DCI format may indicate the timing offset in a slot level between the slot where the DCI format is transmitted and the slot where the scheduled PUSCH is started. The duration of the scheduled PUSCH may be a single super slot.

Regarding PDSCH transmission timing determination, the TDRA indicator in a DCI format may indicate the timing offset in a slot level between the slot where the DCI is transmitted and the slot where the scheduled PDSCH is transmitted.

Furthermore, the PDCCH monitoring occasion may be configured based on a slot level. For example, a PDCCH may be configured to be monitored every one or more slots.

Along with the introduction of the super slot as the scheduling unit, the information indicated in a DCI format may also be redefined to suit the concept of the super slot.

In some embodiments, the TDRA indicator in a DCI format may indicate an entry from a TDRA list. The TDRA list may be configured by RRC signaling or predefined. In some examples, each entry of the list may indicate at least one of the value of k0 and the value of k2 as described above. In some examples, each entry of the list may indicate a mapping type, which may denote, for example, whether the PUSCH or PDSCH mapping starts from a slot boundary. The number of bits in the DCI format for the TDRA indicator may be equal to $[\log_2(I)]$, where I denotes the number of entries in the TDRA list.

In some examples, each entry of the list may indicate at least one start and length indicator value (SLIV), which jointly indicates the starting symbol index and the duration. In response to the DCI format scheduling a TB on a super slot, the starting symbol index means the index of the first scheduled symbol in the first slot of the super slot and the duration means the number of consecutive symbols in the last slot of the super slot. The assigned resource in the last slot of the super slot may be started from its first symbol (e.g., symbol 0). All the middle slots of the super slot (e.g., the slots in the super slot except for the first and the last slots of the super slot) are fully occupied, and thus do not need any further indication. In these examples, a full or partial super slot can be assigned for transmitting the scheduled PDSCH or the PUSCH. A TDRA list including a plurality of entries indicating different SLIVs may be configured or predefined.

An example is shown in FIG. 4, where the starting symbol index of the first scheduled symbol (e.g., symbol 421) in the first slot (e.g., slot 411) of the super slot 419 and the number of scheduled symbols (e.g., duration 423) in the last slot (e.g., slot 417) of the super slot 419 are jointly encoded as a SLIV in an entry of the TDRA list.

In some examples, each entry of the list may indicate the index of the first scheduled symbol in the first slot of the super slot (also referred to as "starting symbol index") and the index of the last scheduled symbol in the last slot of the super slot (also referred to as "last symbol index"). The assigned resource in the last slot of the super slot may be started from its first symbol (e.g., symbol 0). All the middle slots of the super slot (e.g., the slots in the super slot except for the first and the last slots of the super slot) are fully occupied, and thus do not need any further indication. In these examples, a full or partial super slot can be assigned for transmitting the scheduled PDSCH or the PUSCH. A TDRA list including a plurality of entries indicating different starting symbol indices or the last symbol indices may be configured or predefined.

An example is shown in FIG. 5, where the starting symbol index of the first scheduled symbol (e.g., symbol 421) in the first slot (e.g., slot 411) of the super slot 419 and the number of scheduled symbols (e.g., duration 423) in the last slot (e.g., slot 417) of the super slot 419 are separately indicated in an entry of the TDRA list.

In some embodiments, the TDRA indicator in a DCI format may indicate a SLIV, which jointly indicates the starting symbol index and the duration. In response to the DCI format scheduling a TB on a super slot, the starting symbol index means the index of the first scheduled symbol in the first slot of the super slot and the duration means the number of consecutive symbols in the last slot of the super slot. The assigned resource in the last slot of the super slot may be started from its first symbol (e.g., symbol 0). All the middle slots of the super slot (e.g., the slots in the super slot except for the first and the last slots of the super slot) are fully occupied, and thus do not need any further indication. In these embodiments, a full or partial super slot can be assigned for transmitting the scheduled PDSCH or the PUSCH.

In the case that 14 symbols are included in a slot, the number of bits in the DCI format for the TDRA indicator is equal to 7. The 7 bits in the DCI format can flexibly indicate any possible SLIVs in a slot.

In some embodiments, the TDRA indicator in a DCI format may indicate the index of the first scheduled symbol in the first slot of the super slot and the index of the last scheduled symbol in the last slot of the super slot. The assigned resource in the last slot of the super slot may be started from its first symbol (e.g., symbol 0). All the middle slots of the super slot (e.g., the slots in the super slot except for the first and the last slots of the super slot) are fully occupied, and thus do not need any further indication. In these embodiments, a full or partial super slot can be assigned for transmitting the scheduled PDSCH or the PUSCH.

In the case that 14 symbols are included in a slot, each of the starting symbol index and last symbol index at most needs 4 bits to indicate the symbol index range from 0 to 13, and thus at most 8 bits are needed in a DCI format for the TDRA indicator. The 8 bits in the DCI format can flexibly indicate any possible starting symbols in the first slot of a super slot and ending symbols in the last slot of a super slot.

In some embodiments, the TDRA indicator in a DCI format may indicate the index of the first scheduled symbol in the first slot of the super slot. All the symbols in the last slot of the super slot are assigned for transmission. In addition, all the middle slots of the super slot (e.g., the slots in the super slot except for the first and the last slots of the super slot) are fully occupied, and thus also do not need any further indication. In the case that 14 symbols are included in a slot, at most 4 bits are needed in a DCI format for the TDRA indicator to indicate the symbol index range from 0 to 13. In these embodiments, a full or partial super slot can be assigned for transmitting the scheduled PDSCH or the PUSCH.

In some embodiments, the TDRA indicator in a DCI format may indicate the index of the last scheduled symbol in the last slot of the super slot. All the symbols in the first slot of the super slot are assigned for transmission. In addition, all the middle slots of the super slot (e.g., the slots in the super slot except for the first and the last slots of the super slot) are fully occupied, and thus also do not need any further indication. In the case that 14 symbols are included in a slot, at most 4 bits are needed in a DCI format for the TDRA indicator to indicate the symbol index range from 0 to 13. In these embodiments, a full or partial super slot can be assigned for transmitting the scheduled PDSCH or the PUSCH.

In some embodiments, the TDRA indicator in a DCI format may indicate the super slot level offset between the super slot where the DCI format is transmitted and the super slot where the scheduled PDSCH or PUSCH is transmitted. In these embodiments, a full super slot is assigned for transmitting the scheduled PDSCH or the PUSCH. It is not necessary to configure or predefine a TDRA list with different entries for different SLIVs (or starting symbol indices and last symbol indices).

Along with the introduction of the super slot, either as the time domain resource unit or the scheduling unit, the DCI format design may need to be reinforced to differentiate a DCI format for super slot scheduling from that for slot scheduling. For example, considering the support of transmitting a small packet on a single PDSCH or PUSCH, two scheduling units, i.e., super slot level and slot level, may be supported. The payload size of a DCI format scheduling a PDSCH or PUSCH in the super slot level may be the same as the payload size of a DCI format scheduling a PDSCH or PUSCH in the slot level since there may be the same fields in the two DCI formats. Solutions for differentiating the two types of DCI formats are provided in the following text of the present disclosure.

In some embodiments of the present disclosure, separate radio network temporary identities (RNTIs) may be configured to a UE to monitor a DCI format scheduling a PDSCH or a PUSCH on a super slot and a DCI format scheduling a PDSCH or a PUSCH on a slot. With a scrambled cyclic redundancy check (CRC) scrambled by the different RNTIs, the UE can identify whether a current DCI format is used for super slot level scheduling or slot level scheduling.

In some embodiments of the present disclosure, separate search spaces may be configured to a UE to monitor a DCI format scheduling a PDSCH or a PUSCH on a super slot or a DCI format scheduling a PDSCH or a PUSCH on a slot. The search space for monitoring a DCI for super slot level scheduling may be configured with a larger monitoring periodicity than the search space for monitoring a DCI for slot level scheduling.

In some embodiments of the present disclosure, a DCI format may include a bit indicating whether the DCI format is used for super slot level scheduling or not. The bit may include one bit. For example, when the bit is set to 0, it indicates that the scheduled PDSCH or PUSCH is transmitted on a slot, and when the bit is set to 1, it indicates the scheduled PDSCH or PUSCH is transmitted on a super slot: and vice versa.

In some embodiments of the present disclosure, the two types of DCI formats can be differentiated according to their payload sizes. When a DCI format scheduling the PDSCH or PUSCH on a super slot has the same payload size as another DCI format scheduling the PDSCH or PUSCH on a slot, one of the two DCI formats may be inserted with at least one extra bit (e.g., a padding bit). For example, the DCI format for super slot level scheduling may be appended with one bit so that the two DCI formats have different payload sizes, or vice versa.

In some embodiments of the present disclosure, the same DCI format may be used for super slot level scheduling or slot level scheduling. In these embodiments, the TDRA indicator in a DCI format may correspond to an entry from a TDRA list. Each entry of the TDRA list may indicate whether the scheduling unit is a super slot or a slot. For example, in the case that a BS configures the TDRA list to a UE, the BS may use one bit in an entry to indicate that this entry is for scheduling a super slot or a slot. Therefore, either super slot level scheduling or single slot level scheduling being applied can be identified according to the entry indicated by the TDRA indicator field in a DCI format. For example, when a TDRA indicator in a DCI format indicates a single slot for transmission, a UE may assume that the DCI format schedules a single slot for transmission. Otherwise, when the TDRA indicator indicates a super slot for transmission, the UE may assume that the DCI format schedules a super slot for transmission.

Figure 6:
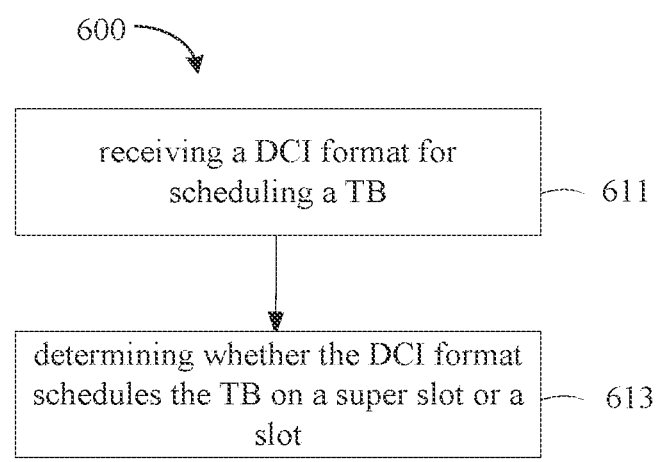
FIG. 6 illustrates a flow chart of an exemplary procedure of wireless communications in accordance with some embodiments of the present disclosure.

FIG. 6 illustrates a flow chart of an exemplary procedure 600 for wireless communications in accordance with some embodiments of the present disclosure. Details described in all of the foregoing embodiments of the present disclosure are applicable for the embodiments shown in FIG. 6. The procedure may be performed by a UE, for example, UE 101 in FIG. 1.

Referring to FIG. 6, in operation 611, a UE may receive a DCI format for scheduling a TB. The TB may be carried by a PDSCH or a PUSCH. In operation 613, the UE may determine whether the DCI format schedules the TB on a super slot or a slot. The super slot may include a plurality of consecutive slots in a time domain resource.

In some embodiments, the UE may determine whether a DCI format schedules the TB on a super slot or a slot based on a radio network temporary identity (RNTI) used to scramble a cyclic redundancy check (CRC) of the DCI format. For example, separate RNTIs may be configured to the UE to monitor a DCI format scheduling PDSCH or PUSCH on a super slot and a DCI format scheduling a PDSCH or a PUSCH on a slot.

In some embodiments, the UE may determine whether a DCI format schedules the TB on a super slot or a slot based on a search space where the DCI format is monitored. For example, separate search spaces may be configured to the UE to monitor a DCI format scheduling a PDSCH or a PUSCH on a super slot or a DCI format scheduling a PDSCH or a PUSCH on a slot.

In some embodiments, the DCI format may include a bit indicating whether a DCI format is used for super slot level scheduling or not. The UE may determine whether the DCI format schedules the TB on a super slot or a slot based on this bit in the received DCI format.

In some embodiments, the UE may determine whether a DCI format schedules the TB on a super slot or a slot based on the payload size of the DCI format. In some examples, the DCI format for super slot level scheduling may include an extra bit to differentiate it from the DCI format for slot level scheduling. In some other examples, the DCI format for slot level scheduling may include an extra bit to differentiate it from the DCI format for super slot level scheduling.

In some embodiments, the DCI format may indicate an entry from a TDRA list. Each entry of the TDRA list may indicate whether the DCI format schedules the TB on a super slot or a slot. Thus, the UE may determine whether a DCI format schedules the TB on a super slot or a slot based on the TDRA indicator.

In some embodiments, the super slot may be used as the time domain resource unit as well as the scheduling unit. The super slot may be defined within a subframe or radio frame and an integer number of the super slots is included in a subframe or radio frame. As described above, by denoting the number of consecutive slots in a super slot as N, in some embodiments, the super slot(s) within a subframe or radio frame may within the subframe or from 0 to $$\frac{N_{slot}^{subframe,\mu}}{N} - 1$$

within be numbered from 0 to $$\frac{N_{slot}^{frame,\mu}}{N} - 1$$

within the radio frame. An example super slot structure is shown in FIG. 3. The number of slots in the super slot may be configured by RRC signaling, or may be predefined according to SCS.

In these embodiments, in response to the DCI format scheduling a PDSCH for carrying the TB on a super slot, the DCI format may indicate a timing offset between the scheduled PDSCH and corresponding HARQ-ACK feedback in units of super slot. In response to the DCI format scheduling a PDSCH for carrying the TB on a super slot, the DCI format may indicate a timing offset between a PDCCH carrying the DCI format and the scheduled PDSCH in units of super slot. In response to the DCI format scheduling a PUSCH for carrying the TB on a super slot, the DCI format may indicate a timing offset between a PDCCH carrying the DCI format and the scheduled PUSCH in units of super slot.

In some embodiments, the super slot may be only used as the scheduling unit. The starting slot of a super slot may be implicitly determined based on the DCI format, instead of being predefined within a subframe or radio frame as described above.

In these embodiments, in response to the DCI format scheduling a PDSCH for carrying the TB on a super slot, the DCI format may indicate a timing offset between the scheduled PDSCH and corresponding HARQ-ACK feedback in units of slot. In response to the DCI format scheduling a PDSCH for carrying the TB on a super slot, the DCI format may indicate a timing offset between a PDCCH carrying the DCI format and the scheduled PDSCH in units of slot. In response to the DCI format scheduling a PUSCH for carrying the TB on a super slot, the DCI format may indicate a timing offset between a PDCCH carrying the DCI format and the scheduled PUSCH in units of slot.

In some embodiments, along with the introduction of the super slot as the scheduling unit, the information indicated in a DCI format may be redefined.

In some examples, the DCI format may indicate an entry from a TDRA list. The UE may receive a RRC signaling message to configure the TDRA list: or the TDRA list may be predefined. In some instances, in response to a DCI format scheduling a TB on a super slot, the entry of the TDRA list may include at least one SLIV indicating the index of the first scheduled symbol in the first slot of the super slot and the number of scheduled symbols in the last slot of the super slot. In some other instances, in response to a DCI format scheduling the TB on the super slot, the entry of the TDRA list may indicate at least the index of the first scheduled symbol in the first slot of the super slot and the index of the last scheduled symbol in the last slot of the super slot.

In some examples, in response to a DCI format scheduling a TB on a super slot, the DCI format may indicate a SLIV, which indicates the index of the first scheduled symbol in the first slot of the super slot and the number of scheduled symbols in the last slot of the super slot.

In some examples, in response to a DCI format scheduling a TB on a super slot, the DCI format may indicate the index of the first scheduled symbol in the first slot of the super slot and the index of the last scheduled symbol in the last slot of the super slot.

In some examples, in response to a DCI format scheduling a TB on a super slot, the DCI format may indicate the index of the first scheduled symbol in the first slot of the super slot. All the symbols in the last slot of the super slot are assigned for transmission. In addition, all the middle slots of the super slot (e.g., the slots in the super slot except for the first and the last slots of the super slot) are fully occupied.

In some examples, in response to a DCI format scheduling a TB on a super slot, the DCI format may indicate the index of the last scheduled symbol in the last slot of the super slot. All the symbols in the first slot of the super slot are assigned for transmission. In addition, all the middle slots of the super slot (e.g., the slots in the super slot except for the first and the last slots of the super slot) are fully occupied.

In some examples, in response to a DCI format scheduling a TB on a super slot, the DCI format may indicate a super slot level offset between the super slot where the DCI format is received and the super slot where the TB is scheduled. In these examples, a full super slot is assigned for transmitting the scheduled TB.

It should be appreciated by persons skilled in the art that the sequence of the operations in exemplary procedure 600 may be changed and some of the operations in exemplary procedure 600 may be eliminated or modified, without departing from the spirit and scope of the disclosure.

Figure 7:
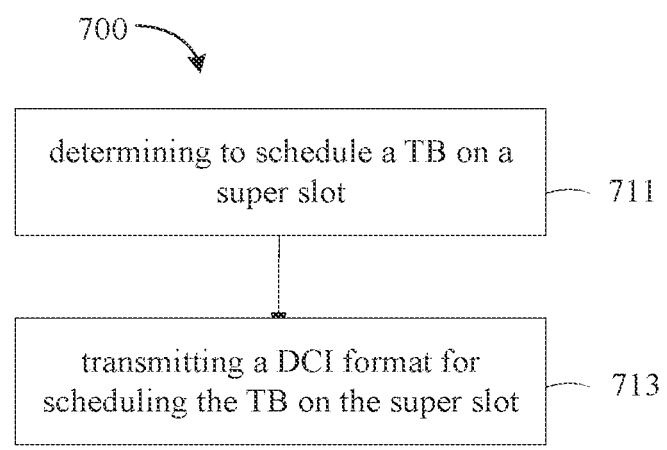
FIG. 7 illustrates a flow chart of an exemplary procedure of wireless communications in accordance with some embodiments of the present disclosure.

FIG. 7 illustrates a flow chart of an exemplary procedure 700 for wireless communications in accordance with some embodiments of the present disclosure. Details described in all of the foregoing embodiments of the present disclosure are applicable for the embodiments shown in FIG. 7. The procedure may be performed by a BS, for example, BS 102 in FIG. 1.

Referring to FIG. 7, in operation 711, a BS may determine to schedule a TB on a super slot. The super slot may include a plurality of consecutive slots in a time domain resource. The TB may be carried by a PDSCH or a PUSCH. In operation 713, the BS may transmit a DCI format for scheduling the TB on the super slot to a UE.

In some embodiments, a CRC of the DCI format may be scrambled by a RNTI for super slot level scheduling. For example, separate RNTIs may be configured to the UE to monitor a DCI format scheduling a TB on a super slot and a DCI format scheduling a TB on a slot.

In some embodiments, the DCI format may be transmitted in a search space for super slot level scheduling. For example, separate search spaces may be configured to the UE to monitor a DCI format scheduling a PDSCH or a PUSCH on a super slot or a DCI format scheduling a PDSCH or a PUSCH on a slot.

In some embodiments, the DCI format may include a bit indicating whether a DCI format is used for super slot level scheduling or not.

In some embodiments, the DCI format may have a payload size different from that of a DCI format scheduling a TB on a slot. For example, in some cases, the actual payload size of a DCI format for super slot level scheduling may be the same as the actual payload size of a DCI format for slot level scheduling. The BS may insert at least one extra bit to one of the two DCI formats such that their payload sizes are different. In this way, the DCI format for super slot level scheduling may include an extra bit to differentiate it from the DCI format for slot level scheduling: or the DCI format for slot level scheduling may include an extra bit to differentiate it from the DCI format for super slot level scheduling.

In some embodiments, the DCI format may indicate a specific entry from a TDRA list. Each entry of the TDRA list may indicate whether the DCI format schedules the TB on a super slot or a slot. The specific entry may indicate that the DCI format schedules the TB on a super slot.

In some embodiments, the super slot may be used as the time domain resource unit as well as the scheduling unit. The super slot may be defined within a subframe or a radio frame and an integer number of the super slots is included in a subframe or radio frame. The BS may transmit the number of slots in a super slot to the UE via a RRC signaling message: or the number of slots in a super slot may be predefined according to SCS. In some examples, the numbers of slots in a UL super slot and a DL super slot may be the same. In some other examples, the number of slots in a UL super slot and a DL super slot may be different, and thus may be separately configured or predefined.

In these embodiments, in response to the DCI format scheduling a PDSCH for carrying the TB on the super slot, the DCI format may indicate a timing offset between the scheduled PDSCH and corresponding HARQ-ACK feedback in units of super slot. In response to the DCI format scheduling a PDSCH for carrying the TB on a super slot, the DCI format may indicate a timing offset between a PDCCH carrying the DCI format and the scheduled PDSCH in units of super slot. In response to response to the DCI format scheduling a PUSCH for carrying the TB on a super slot, the DCI format may indicate a timing offset between a PDCCH carrying the DCI format and the scheduled PUSCH in units of super slot.

In some embodiments, the super slot may be only used as the scheduling unit. The starting slot of a super slot may be implicitly determined based on the DCI format, instead of being predefined within a subframe or radio frame as described above.

In these embodiments, in response to the DCI format scheduling a PDSCH for carrying the TB on a super slot, the DCI format may indicate a timing offset between the scheduled PDSCH and corresponding HARQ-ACK feedback in units of slot. In response to the DCI format scheduling a PDSCH for carrying the TB on a super slot, the DCI format may indicate a timing offset between a PDCCH carrying the DCI format and the scheduled PDSCH in units of slot. In response to response to the DCI format scheduling a PUSCH for carrying the TB on a super slot, the DCI format may indicate a timing offset between a PDCCH carrying the DCI format and the scheduled PUSCH in units of slot.

In some embodiments, along with the introduction of the super slot as the scheduling unit, the information indicated in a DCI format may be redefined.

In some examples, the DCI format may indicate an entry from a TDRA list. The BS may transmit a RRC signaling message to configure the TDRA list: or the TDRA list may be predefined. In some instances, the entry of the TDRA list may include at least one SLIV indicating the index of the first scheduled symbol in the first slot of the super slot and the number of scheduled symbols in the last slot of the super slot. In some other instances, the entry of the TDRA list may indicate at least the index of the first scheduled symbol in the first slot of the super slot and the index of the last scheduled symbol in the last slot of the super slot.

In some examples, the DCI format may indicate a SLIV, which indicates the index of the first scheduled symbol in the first slot of the super slot and the number of scheduled symbols in the last slot of the super slot.

In some examples, the DCI format may indicate the index of the first scheduled symbol in the first slot of the super slot and the index of the last scheduled symbol in the last slot of the super slot.

In some examples, the DCI format may indicate the index of the first scheduled symbol in the first slot of the super slot. All the symbols in the last slot of the super slot are assigned for transmission. In addition, all the middle slots of the super slot (e.g., the slots in the super slot except for the first and the last slots of the super slot) are fully occupied.

In some examples, the DCI format may indicate the index of the last scheduled symbol in the last slot of the super slot. All the symbols in the first slot of the super slot are assigned for transmission. In addition, all the middle slots of the super slot (e.g., the slots in the super slot except for the first and the last slots of the super slot) are fully occupied.

In some examples, the DCI format may indicate a super slot level offset between the super slot where the DCI format is received and the super slot where the TB is scheduled. In these examples, a full super slot is assigned for transmitting the scheduled TB.

It should be appreciated by persons skilled in the art that the sequence of the operations in exemplary procedure 700 may be changed and some of the operations in exemplary procedure 700 may be eliminated or modified, without departing from the spirit and scope of the disclosure.

Figure 8:
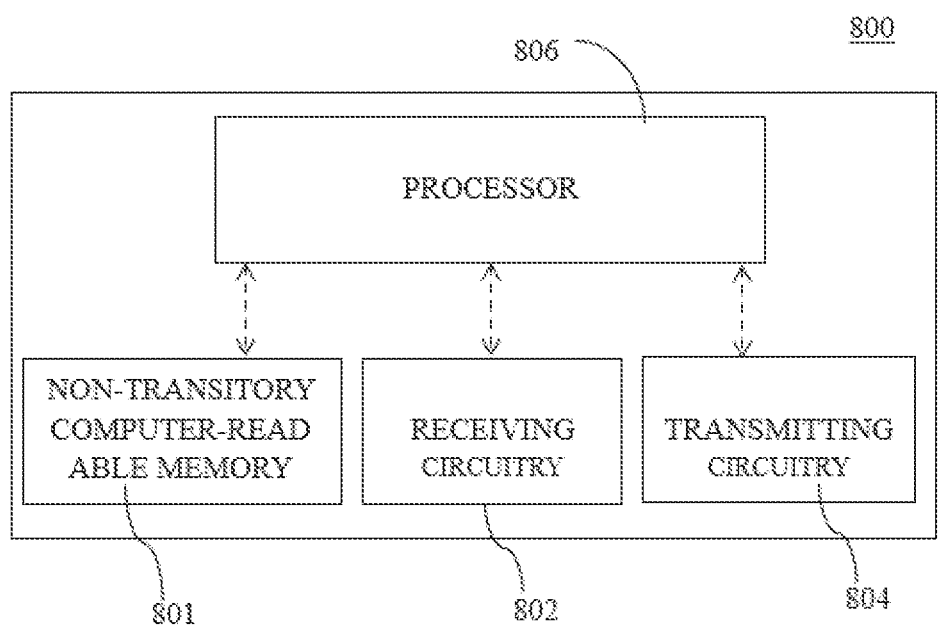
FIG. 8 illustrates a block diagram of an exemplary apparatus in accordance with some embodiments of the present disclosure.

FIG. 8 illustrates a block diagram of an exemplary apparatus 800 according to some embodiments of the present disclosure.

As shown in FIG. 8, the apparatus 800 may include at least one non-transitory computer-readable medium 801, at least one receiving circuitry 802, at least one transmitting circuitry 804, and at least one processor 806 coupled to the non-transitory computer-readable medium 801, the receiving circuitry 802 and the transmitting circuitry 804. The apparatus 800 may be a base station side apparatus (e.g., a BS) or a communication device (e.g., a UE).

Although in this figure, elements such as the at least one processor 806, transmitting circuitry 804, and receiving circuitry 802 are described in the singular, the plural is contemplated unless a limitation to the singular is explicitly stated. In some embodiments of the present application, the receiving circuitry 802 and the transmitting circuitry 804 are combined into a single device, such as a transceiver. In certain embodiments of the present application, the apparatus 800 may further include an input device, a memory, and/or other components.

In some embodiments of the present disclosure, the non-transitory computer-readable medium 801 may have stored thereon computer-executable instructions to cause a processor to implement the method with respect to the UEs as described above. For example, the computer-executable instructions, when executed, cause the processor 806 interacting with receiving circuitry 802 and transmitting circuitry 804, so as to perform the operations with respect to the UEs described in FIGS. 1-6.

In some embodiments of the present disclosure, the non-transitory computer-readable medium 801 may have stored thereon computer-executable instructions to cause a processor to implement the method with respect to the BSs as described above. For example, the computer-executable instructions, when executed, cause the processor 806 interacting with receiving circuitry 802 and transmitting circuitry 804, so as to perform the operations with respect to the BSs described in FIGS. 1-5 and 7.

Those having ordinary skill in the art would understand that the operations or steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the operations or steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including." The wording "the first," "the second" or the like is only used to clearly illustrate the embodiments of the present application, but is not used to limit the substance of the present application.

What is claimed:

1. A method performed by a user equipment (UE), comprising:
   receiving a downlink control information (DCI) format for scheduling a transport block (TB); and
   determining whether the DCI format schedules the TB on a super slot or a slot, wherein the super slot includes a plurality of consecutive slots in a time domain resource;
   wherein the DCI format indicates an entry from a time domain resource allocation (TDRA) list, and the TDRA list is configured by radio resource control (RRC) signaling or predefined;
   wherein each entry of the TDRA list indicates whether the DCI format schedules the TB on a super slot or a slot.

2. The method of claim 1, wherein the super slot is defined within a subframe or radio frame and an integer number of super slots is included in a subframe or radio frame.

3. The method of claim 2, wherein the integer number of slots in the super slot is configured by radio resource control (RRC) signaling, or is predefined according to subcarrier spacing.

4. The method of claim 1, wherein in response to the DCI format scheduling a physical downlink shared channel (PDSCH) for carrying the TB on the super slot,
   a timing offset between the PDSCH and corresponding hybrid automatic repeat request acknowledgement (HARQ-ACK) feedback is indicated by the DCI format in units of super slot.

5. The method of claim 1, wherein in response to the DCI format scheduling a physical downlink shared channel (PDSCH) for carrying the TB on the super slot,
   a timing offset between a physical downlink control channel (PDCCH) carrying the DCI format and the PDSCH is indicated by the DCI format in units of super slot.

6. The method of claim 1, wherein in response to the DCI format scheduling a physical uplink shared channel (PUSCH) for carrying the TB on the super slot,
   a timing offset between a physical downlink control channel (PDCCH) carrying the DCI format and the PUSCH is indicated by the DCI format in units of super slot.

7. An user equipment (UE) for wireless communication, comprising:
   at least one memory; and
   at least one processor coupled with the at least one memory and operable to cause the UE to:
   receive a downlink control information (DCI) format for scheduling a transport block (TB); and
   determine whether the DCI format schedules the TB on a super slot or a slot, wherein the super slot includes a plurality of consecutive slots in a time domain resource;

wherein the DCI format indicates an entry from a time domain resource allocation (TDRA) list, and the TDRA list is configured by radio resource control (RRC) signaling or predefined;

wherein each entry of the TDRA list indicates whether the DCI format schedules the TB on a super slot or a slot.

8. The UE of claim 7, wherein the super slot is defined within a subframe or radio frame and an integer number of super slots is included in a subframe or radio frame.

9. The UE of claim 8, wherein the integer number of slots in the super slot is configured by radio resource control (RRC) signaling, or is predefined according to subcarrier spacing.

10. The UE of claim 7, wherein in response to the DCI format scheduling a physical downlink shared channel (PDSCH) for carrying the TB on the super slot,
a timing offset between the PDSCH and corresponding hybrid automatic repeat request acknowledgement (HARQ-ACK) feedback is indicated by the DCI format in units of super slot.

11. The apparatus UE of claim 7, wherein in response to the DCI format scheduling a physical downlink shared channel (PDSCH) for carrying the TB on the super slot,
a timing offset between a physical downlink control channel (PDCCH) carrying the DCI format and the PDSCH is indicated by the DCI format in units of super slot.

12. The UE of claim 7, wherein in response to the DCI format scheduling a physical uplink shared channel (PUSCH) for carrying the TB on the super slot,
a timing offset between a physical downlink control channel (PDCCH) carrying the DCI format and the PUSCH is indicated by the DCI format in units of super slot.

13. The UE of claim 7, wherein in response to the DCI format scheduling the TB on the super slot,
the entry of the TDRA list includes at least one start and length indicator value (SLIV) indicating an index of a first scheduled symbol in a first slot of the super slot and a number of scheduled symbols in a last slot of the super slot; or
the entry of the TDRA list indicates at least the index of the first scheduled symbol in the first slot of the super slot and an index of a last scheduled symbol in the last slot of the super slot.

14. The UE of claim 7, wherein in response to the DCI format scheduling the TB on the super slot, the DCI format indicates at least one of:
a start and length indicator value (SLIV) indicating an index of a first scheduled symbol in a first slot of the super slot and a number of scheduled symbols in a last slot of the super slot;
the index of the first scheduled symbol in the first slot of the super slot and an index of a last scheduled symbol in the last slot of the super slot;

the index of the first scheduled symbol in the first slot of the super slot;
the index of the last scheduled symbol in the last slot of the super slot; and
a super slot level offset between a super slot where the DCI format is received and a super slot where the TB is scheduled.

15. The UE of claim 7, wherein to determine whether the DCI format schedules the TB on a super slot or a slot is based on at least one of:
a radio network temporary identity (RNTI) used to scramble cyclic redundancy check (CRC) of the DCI format; and
a search space where the DCI format is monitored.

16. The UE of claim 7, wherein the DCI format includes a bit indicating whether the DCI format is used for super slot level scheduling or not.

17. The UE of claim 7, wherein determining whether the DCI format schedules the TB on a super slot or a slot is based on a payload size of the DCI format.

18. The UE of claim 17, wherein the DCI format for super slot level scheduling includes an extra bit to differentiate the DCI format for super slot level scheduling from the DCI format for slot level scheduling, or the DCI format for slot level scheduling includes an extra bit to differentiate the DCI format for slot level scheduling from the DCI format for super slot level scheduling.

19. A base station for wireless communication, comprising:
at least one memory; and
at least one processor coupled with the at least one memory and operable to cause the base station to:
determine to schedule a transport block (TB) on a super slot, wherein the super slot includes a plurality of consecutive slots in a time domain resource; and
transmit a downlink control information (DCI) format for scheduling the TB on the super slot; and
wherein the DCI format indicates an entry from a time domain resource allocation (TDRA) list, and the TDRA list is configured by radio resource control (RRC) signaling or predefined;
wherein each entry of the TDRA list indicates whether the DCI format schedules the TB on a super slot or a slot.

20. A method performed by a base station, comprising:
determining to schedule a transport block (TB) on a super slot, wherein the super slot includes a plurality of consecutive slots in a time domain resource; and
transmitting a downlink control information (DCI) format for scheduling the TB on the super slot; and
wherein the DCI format indicates an entry from a time domain resource allocation (TDRA) list, and the TDRA list is configured by radio resource control (RRC) signaling or predefined;
wherein each entry of the TDRA list indicates whether the DCI format schedules the TB on a super slot or a slot.

* * * * *